(12) United States Patent
Yoshihama

(10) Patent No.: US 9,180,911 B2
(45) Date of Patent: Nov. 10, 2015

(54) VEHICLE OPERATING CONDITION DETERMINING SYSTEM, DRIVING ASSIST SYSTEM, AND OPERATING CONDITION DETERMINING METHOD

(75) Inventor: Yuki Yoshihama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 13/876,104

(22) PCT Filed: Sep. 29, 2011

(86) PCT No.: PCT/IB2011/002266
§ 371 (c)(1),
(2), (4) Date: Mar. 26, 2013

(87) PCT Pub. No.: WO2012/042354
PCT Pub. Date: Apr. 5, 2012

(65) Prior Publication Data
US 2013/0197713 A1    Aug. 1, 2013

(30) Foreign Application Priority Data
Oct. 1, 2010    (JP) .................... 2010-224159

(51) Int. Cl.
*B60W 30/12*    (2006.01)
*B60W 40/09*    (2012.01)
(Continued)

(52) U.S. Cl.
CPC ............. *B62D 15/021* (2013.01); *B60W 50/10* (2013.01); *B62D 1/286* (2013.01); *B62D 15/025* (2013.01); *B60T 2201/10* (2013.01); *B60W 30/12* (2013.01); *B60W 40/09* (2013.01); *B60W 2510/202* (2013.01); *B60W 2520/125* (2013.01); *B60W 2520/14* (2013.01); *B60W 2540/18* (2013.01); *B62D 5/003* (2013.01)

(58) Field of Classification Search
CPC ...... B62D 15/025; B62D 1/286; B62D 5/003; B60T 2201/10; B60W 2520/125; B60W 2520/14
USPC ................................. 701/41, 43, 47
See application file for complete search history.

(56) References Cited

U.S. PATENT DOCUMENTS 5,765,116 A * 6/1998 Wilson-Jones et al. ......... 701/41
6,212,452 B1 * 4/2001 Shimizu et al. .................. 701/41
(Continued)

FOREIGN PATENT DOCUMENTS

CN    101553389 A    10/2009
EP    1 950 115 A2    7/2008
(Continued)

OTHER PUBLICATIONS

Jan. 31, 2012 International Search Report issued in International Patent Application No. PCT/IB2011/002266.

Primary Examiner — Fadey Jabr
Assistant Examiner — Thomas Ingram
(74) Attorney, Agent, or Firm — Oliff PLC

(57) ABSTRACT

A vehicle operating condition determining system determines, when a turning angle of wheels or a steering angle of a steering wheel changes, that the turning angle of the wheels or the steering angle of the steering wheel changes due to a driver's intention, under a condition that the magnitude of steering torque applied to a steering device is kept equal to or larger than a threshold value after the torque reaches a peak, for a period of time equal to or longer than a reference time.

4 Claims, 4 Drawing Sheets

(51) Int. Cl.
  *B60W 50/10* (2012.01)
  *B62D 15/02* (2006.01)
  *B62D 5/00* (2006.01)
  *B62D 1/28* (2006.01)

(56) References Cited

U.S. PATENT DOCUMENTS

| | | | |
|---|---|---|---|
| 8,056,667 B2 * | 11/2011 | Moshchuk et al. | 180/169 |
| 8,095,271 B2 * | 1/2012 | Lee | 701/41 |
| 8,660,749 B2 * | 2/2014 | Hayama et al. | 701/41 |
| 8,688,327 B2 * | 4/2014 | Limpibunterng et al. | 701/42 |
| 2001/0054519 A1 * | 12/2001 | Nishiwaki et al. | 180/167 |
| 2007/0115105 A1 * | 5/2007 | Schmitz | 340/439 |
| 2009/0260913 A1 * | 10/2009 | Ito et al. | 180/444 |

FOREIGN PATENT DOCUMENTS

| | | |
|---|---|---|
| FR | 2 787 081 | 6/2000 |
| JP | A-9-277848 | 10/1997 |
| JP | A-2003-81115 | 3/2003 |
| JP | 2005-212689 A | 8/2005 |
| JP | 2005-343305 A | 12/2005 |
| JP | A-2006-515545 | 6/2006 |
| WO | 2008/051144 A1 | 5/2008 |

* cited by examiner

VEHICLE OPERATING CONDITION DETERMINING SYSTEM, DRIVING ASSIST SYSTEM, AND OPERATING CONDITION DETERMINING METHOD

BACKGROUND OF THE INVENTION

1. Field of the Invention

The invention relates to an operating condition determining system, an operating condition determining method, and a driving assist system, for determining operating conditions concerning operations performed by a driver of a vehicle.

2. Description of Related Art

A technology of assisting the driver in a driving operation in order to enhance the safety of the vehicle, such as an automobile, has been proposed. For example, a system that informs the driver of the presence of an obstacle or deviation of the vehicle from a running course, and a system that assists the driver in an operation to circumvent or avoid the obstacle or an operation to cause the vehicle to return to the course are known.

It is desirable that the systems as described above do not operate in response to vehicle behaviors caused by the driver's intentional operations. In Japanese Patent Application Publication No. 2006-515545 (JP-A-2006-515545), for example, it is proposed to determine that a lane change is made by the driver's intention when the steering angle exceeds a threshold value or the accelerator pedal operation amount (accelerator pedal stroke) exceeds a threshold value, and restrict the operation of the driving assist system.

In the meantime, the steering angle also changes when the turning angle of the wheels changes due to disturbances, such as the shape of the road surface and vibrations of the vehicle body. Also, when the running speed of the vehicle is high, the steering angle may be small even when a lane change is made by the intention of the driver. Thus, there is a possibility that an intentional driving operation of the driver is not correctly determined.

SUMMARY OF THE INVENTION

The invention provides a vehicle operating condition determining system, a driving assist system, and an operating condition determining method, which determine driver's intentional driving operations more correctly.

To provide the system or method as described above, the inventor paid attention to a steering holding operation as a phenomena peculiar to the case where the driver intentionally operates a steering device.

More specifically, the inventor found as a result of diligent experiments and studies that, when the driver intentionally operates the steering device, torque (which will be called "steering holding torque") is applied against steering reaction force even after torque (steering torque) applied to the steering device reaches a peak.

A vehicle operating condition determining system according to a first aspect of the invention is configured to determine, when a turning angle of wheels or a steering angle of a steering wheel changes, whether the turning angle of the wheels or the steering angle of the steering wheel changes due to a driver's intention, based on a magnitude of steering torque applied to a steering device or a magnitude of a physical quantity correlated with the steering torque, which is measured after the steering torque or the physical quantity reaches a peak. According to this aspect of the invention, it can be more correctly determined whether the driver intentionally operates the steering device.

In the vehicle operating condition determining system according to the above aspect of the invention, it may be determined whether the turning angle of the wheels or the steering angle of the steering wheel changes due to the driver's intention, using a change in the magnitude of the steering torque applied to the steering device or the physical quantity correlated with the steering torque, which is measured after the steering torque or the physical quantity reaches the peak. Namely, the magnitude of the steering torque or the physical quantity after it reaches the peak changes in different fashions, depending on whether the steering holding torque is applied or not. Accordingly, it can be determined whether the driver intentionally operates the steering device, using changes in the magnitude of the steering torque or the physical quantity after it reaches the peak.

The vehicle operating condition determining system according to the above aspect of the invention may include detecting means for detecting the steering torque applied to the steering device or the physical quantity correlated with the steering torque when the turning angle of the wheels or the steering angle of the steering wheel changes, measuring means for measuring a length of time for which the magnitude of the steering torque or the physical quantity detected by the detecting means is kept equal to or larger than a threshold value after the magnitude of the steering torque or the physical quantity reaches the peak, and determining means for determining that the turning angle of the wheels or the steering angle of the steering wheel changes due to the driver's intention, when the length of time measured by the measuring means is equal to or longer than a reference time.

The "threshold value" mentioned herein is set to a value that is larger than the maximum torque that can be applied to the steering device by a driver who is in a condition of low wakefulness and low consciousness. Also, the "reference time" is set to a length of time that is longer than the maximum value of the time for which the maximum torque that can be applied to the steering device by a driver who is in a condition of low wakefulness and low consciousness can be maintained (the time for which the maximum torque can be kept applied to the steering device). These "threshold value" and "reference time" may be obtained in advance by adaptive procedures using experiments, or the like.

With the arrangement as described above, when the turning angle of the wheels or the steering angle of the steering wheel changes without depending on or involving an intentional operation of the driver, it is possible to avoid a situation where it is erroneously determined that the turning angle of the wheels or the steering angle of the steering wheel changes due to intentional steering by the driver.

Also, in the vehicle operating condition determining system according to the above aspect of the invention, the determining means may determine that the turning angle of the wheels or the steering angle of the steering wheel changes due to the driver's intention, when the peak of the magnitude of the steering torque or the physical quantity detected by the detecting means is equal to or larger than a reference peak value that is larger than the threshold value, and the length of time measured by the measuring means is equal to or longer than the reference time.

The "reference peak value" mentioned herein is set to a value that is larger than the maximum value of torque that can be applied to the steering device by a highly wakeful driver (whose consciousness is deteriorated by a low degree) so as to keep the vehicle running straight, and is larger than the maximum value of torque that can be applied to the steering device by a poorly wakeful driver (whose consciousness is deteriorated by a high degree).

With the arrangement as described above, when the turning angle of the wheels or the steering angle of the steering wheel changes without depending on or involving an intentional operation of the driver, it is possible to more reliably avoid a situation where it is erroneously determined that the turning angle of the wheels or the steering angle of the steering wheel changes due to intentional steering by the driver.

In the above aspect of the invention, the physical quantity correlated with the torque (steering torque) applied to the steering device may be selected from, for example, the steering amount of the steering device, the output signal (steering angle) of the steering angle sensor, the output signal (the yaw rate applied to the vehicle) of the yaw rate sensor.

A method of determining an operating condition of a vehicle according to a second aspect of the invention includes the step of determining, when an operation amount of an operating device operated by a driver changes, whether the operation amount changes due to a driver's intention, based on a magnitude of steering torque applied to the operating device or a magnitude of a physical quantity correlated with the steering torque, which is measured after the steering torque or the physical quantity reaches a peak.

The "operating device" mentioned herein is not limited to the steering device, but may be any device that can produce reaction force against an operation of the operating device. For example, the operating device may be an accelerator pedal to which reaction force of a return spring is applied in response to an operation to depress the accelerator pedal.

A vehicle driving assist system according to a third aspect of the invention restricts execution of a driving assisting process when a turning angle of wheels or a steering angle of a steering wheel changes, based on a magnitude of steering torque applied to a steering device or a magnitude of a physical quantity correlated with the steering torque, which is measured after the steering torque or the physical quantity reaches a peak.

The "driving assisting process" mentioned herein may be, for example, a process of informing the driver of the presence of an obstacle or deviation of the vehicle from the course, a process of assisting the driver in an operation required to circumvent or avoid an obstacle or cause the vehicle to return to the course, or the like.

According to the above aspect of the invention, execution of the driving assisting process can be restricted when the vehicle deviates from the course or approaches a course boundary due to an intentional operation of the driver. The "restriction" mentioned herein includes inhibition of both of the process of informing the driver of the presence of an obstacle or deviation of the vehicle from the course and the process of assisting the driver in an operation to circumvent the obstacle or an operation to cause the vehicle to return to the course, and inhibition of only one of the process of informing the driver of the presence of an obstacle or deviation of the vehicle from the course and the process of assisting the driver in an operation to circumvent the obstacle or an operation to cause the vehicle to return to the course.

In the vehicle driving assist system according to the above aspect of the invention, execution of the driving assisting process may be restricted, using a change in the magnitude of the steering torque applied to the steering device or the physical quantity correlated with the steering torque, which is measured after the steering torque or the physical quantity reaches the peak.

The vehicle driving assist system according to the above aspect of the invention may include detecting means for detecting the steering torque applied to the steering device or the physical quantity correlated with the steering torque when the turning angle of the wheels or the steering angle of the steering wheel changes, measuring means for measuring a length of time for which the magnitude of the steering torque or the physical quantity detected by the detecting means is kept equal to or larger than a threshold value after the magnitude of the steering torque or the physical quantity reaches the peak, and restricting means for restricting execution of the driving assisting process when the length of time measured by the measuring means is equal to or longer than a reference time.

The "threshold value" and "reference time" mentioned herein are set in the same manners as the "threshold value" and "reference time" set by the vehicle operating condition determining system as described above.

With the arrangement according to the above aspect of the invention, when the turning angle of the wheels or the steering angle of the steering wheel changes without depending on or involving an intentional operation of the driver, it is possible to more reliably avoid a situation where execution of the driving assisting process is restricted.

With the vehicle driving assist system according to the above aspect of the invention, an intentional driving operation performed by the driver can be determined more correctly.

Also, the vehicle driving assist system according to the above aspect of the invention is able to restrict execution of the driving assisting process when the driver intentionally performs a driving operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of the invention will be described with reference to the drawings. In the following, a driving assist system that determines a running course of the vehicle and an obstacle, and performs a driving assisting process for preventing the vehicle from deviating from the determined course or colliding with the obstacle will be described. The "driving assisting process" mentioned herein is carried out at the time when the vehicle is able to circumvent or avoid the obstacle, and is carried out at an earlier time than a collision damage alleviating process carried out when a collision between the vehicle and the obstacle cannot be avoided. It is to be understood that the configuration of the system which will be described below illustrates one embodiment of the invention, and the invention is not limited to the configuration as described below.

Figure 1:
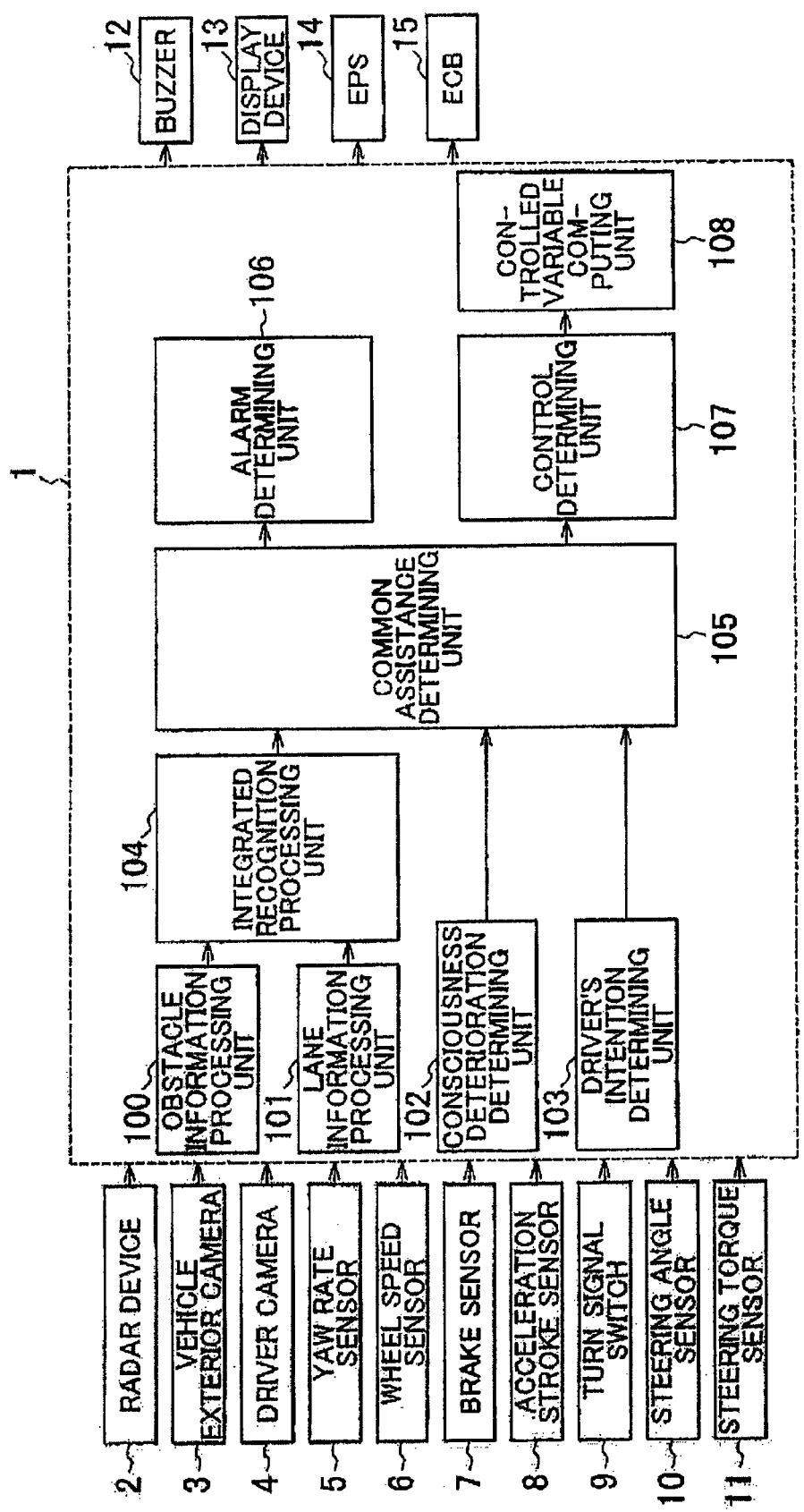
FIG. 1 is a block diagram illustrating the configuration (functional units) of a vehicle driving assist system as a first embodiment of the invention.

Initially, a first embodiment of the invention will be described with reference to FIG. 1 through FIG. 3. FIG. 1 is a block diagram illustrating the configuration (functional units) of a vehicle driving assist system to which the invention is applied. As shown in FIG. 1, a control unit (ECU) 1 for driving assist is installed on the vehicle.

The ECU 1 is an electronic control unit including CPU, ROM, RAM, backup RAM, and an I/O interface. Various sensors, such as a radar device 2, vehicle exterior camera 3 for photographing the exterior or outside of the vehicle, driver camera 4 for photographing the driver, yaw rate sensor 5, wheel speed sensor 6, brake sensor 7, acceleration stroke sensor 8, turn signal switch 9, steering angle sensor 10, and a steering torque sensor 11, are electrically connected to the ECU 1, and the ECU 1 receives output signals of these sensors.

The radar device 2 is mounted on the front side of the vehicle, for example, and is operable to transmit millimeter waves to the front of the vehicle and receive radio waves (reflected waves) reflected by an object located outside the vehicle, thereby to generate information (for example, coordinate information) concerning the position of the object relative to the vehicle. The vehicle exterior camera 3 is placed within the vehicle compartment at a position where the camera can capture the front of the vehicle in the field of view, for example, and generates an image of the front of the vehicle. The driver camera 4 is placed within the vehicle compartment at a position where the camera can capture the driver in the field of view, for example, and generates an image of the driver. The yaw rate sensor 5 is mounted on the vehicle body, for example, and generates an electric signal correlated with the yaw rate of the vehicle. The wheel speed sensor 6 is mounted on a wheel of the vehicle, and generates an electric signal correlated with the running speed of the vehicle.

For example, the brake sensor 7 is mounted on a brake pedal within the vehicle compartment, and generates an electric signal correlated with the operation torque (pedal pressure) applied to the brake pedal. The acceleration stroke sensor 8 is mounted on an accelerator pedal within the vehicle department, and generates an electric signal correlated with the operation torque (pedal pressure) applied to the accelerator pedal. The turn signal switch 9 is mounted on a turn signal lever within the vehicle compartment, and generates an electric signal correlated with a direction indicated by a turn signal (a direction indicator) when the turn signal lever is operated. The steering angle sensor 10 is mounted on a steering rod connected to a steering wheel within the vehicle compartment, and generates an electric signal correlated with the angle of rotation of the steering wheel as measured from the neutral position. The steering torque sensor 11 is mounted on the steering rod, and generates an electric signal correlated with torque (steering torque) applied to the steering wheel.

Also, various devices and systems, such as a buzzer 12, display device 13, electric power steering (EPS) system 14, and an electronically controlled brake (ECB) system 15, are connected to the ECU 1, and these devices and systems are electrically controlled by the ECU 1.

For example, the buzzer 12 is mounted in the vehicle compartment, and is operable to generate an alarm or warning tone. The displace device 13 is mounted in the vehicle compartment, and is operable to display various messages and/or warning lamps. The electric power steering (EPS) system 14 is operable to assist the driver in operating the steering wheel, using torque generated by an electric motor. The electronically controlled brake (ECB) system 15 is operable to electrically adjust the hydraulic pressure (brake pressure) of a friction brake provided on each wheel.

The ECU 1 has the functions as described below, so as to control various devices and systems, using the output signals of the above-indicated various sensors. Namely, the ECU 1 includes an obstacle information processing unit 100, a lane information processing unit 101, a consciousness deterioration determining unit 102, a driver's intention determining unit 103, an integrated recognition processing unit 104, a common assist determining unit 105, an alarm determining unit 106, a control determining unit 107, and a controlled variable computing unit 108.

The obstacle information processing unit 100 computes coordinates of the position of an object in a coordinate system in which the self vehicle lies on the origin, based on the object information generated from the radar device 2. The obstacle information processing unit 100 creates obstacle information including the coordinates of the position of the object and the yaw angle of the self vehicle relative to the object. When two or more objects are detected by the radar device 2, the obstacle information processing unit 100 creates a regression line (or a regression curve) that can circumvent the two or more objects, on the coordinate system in which the self vehicle lies on the origin, and creates obstacle information including coordinate information of the regression line (or regression curve) and the yaw angle of the vehicle relative to the regression line (or regression curve). The obstacle information processing unit 100 may create obstacle information as described above, based on an image or picture captured by the vehicle exterior camera 3.

The lane information processing unit 101 creates lane information including information concerning a lane and information concerning the orientation of the vehicle relative to the lane, based on an image or picture captured by the vehicle exterior camera 3. The information concerning the lane includes, for example, information concerning indicators indicative of lane boundaries (for example, road markers, such as white lines and yellow lines, indicative of lane boundaries, and three-dimensional objects, such as curbs, guardrails, gutters or ditches, and walls, which extend alongside the lane), and information concerning the width of the lane. The information concerning the orientation of the vehicle relative to the lane includes, for example, information concerning distances between the indicators indicative of the lane boundaries and the vehicle, information concerning the offset amount of the vehicle position relative to the center of the lane, and information concerning the yaw angle of the vehicle travelling direction relative to the indicators indicative of the lane boundaries. When a navigation system is installed on the vehicle, the lane information processing unit 101 may create information concerning the lane, from map information and GPS information possessed by the navigation system.

The consciousness deterioration determining unit 102 determines the degree of deterioration of consciousness (wakefulness) of the driver, based on an image or picture captured by the driver camera 4. For example, the consciousness deterioration determining unit 102 computes the eye closure time or eye closure frequency of the driver, from the image captured by the driver camera 4, and determines that the consciousness of the driver is deteriorated (the wakefulness is low) when the eye closure time or eye closure frequency exceeds the upper limit. Also, the consciousness deterioration determining unit 102 may compute a length of time for which the orientation of the driver's face or the direction of the line of sight deviates from the vehicle travelling direction, from an image or picture captured by the driver camera 4, and may determine that the driver is not looking at the road when the calculated time exceeds the upper limit.

The driver's intention determining unit 103 determines whether the operation amount of the brake pedal, the operation amount of the accelerator pedal, or the operation amount (steering amount) of the steering wheel changes due to the intention of the driver, based on the output signals of the wheel speed sensor 6, brake sensor 7, acceleration stroke sensor 8, turn signal switch 9, steering angle sensor 10, and the steering torque sensor 11. The driver's intention determining unit 103 will be described in detail later.

The integrated recognition processing unit 104 specifies a region (running course) on which the vehicle is able to run, based on the obstacle information created by the obstacle information processing unit 100 and the lane information created by the lane information processing unit 101, and determines the yaw angle of the vehicle relative to a course boundary, and the offset amount of the vehicle relative to the center of the course.

On a road having a small lane width, the driver may have no other choice but to let the vehicle deviate from the lane. In view of this situation, the integrated recognition processing unit 104 may set a running course, on a road having a small lane width, based on information concerning road markers (such as white lines and yellow lines) indicative of the lane boundaries, or three-dimensional objects (such as curbs, guardrails, gutters, and walls) that extend alongside the lane. For example, when road markers are present on both sides of the lane, the integrated recognition processing unit 104 may set a running course that is wider than the original lane, with reference to the center of the lane (intermediate between the road markers present on both sides of the lane). Also, when a road marker is present on only one side of the lane, the integrated recognition processing unit 104 may set a reference position outside the road marker, and set a range of a given width from the reference position, as a running course. However, if an object exists in the course thus enlarged, it is desirable to limit enlarging setting of the course.

When the integrated recognition processing unit 104 receives information concerning a small object from the obstacle information processing unit 100, the processing unit 104 may set the running course, by enlarging the size of the object in a direction parallel to the indicators indicative of the lane boundaries. Namely, the integrated recognition processing unit 104 may set the course, assuming that an object represented by a point on a coordinate system is in the form of a line parallel to the indicators indicative of the lane boundaries. The amount of enlargement of the object (the length of the line) may be increased as the output signal (vehicle speed) of the wheel speed sensor 6 is higher, and may also be increased as the yaw angle of the vehicle relative to the line is larger.

The common assist determining unit 105 determines whether execution of the driving assisting process is to be restricted, based on the information created by the integrated recognition processing unit 104, the result of determination made by the consciousness deterioration determining unit 102, and the result of determination made by the driver's intention determining unit 103. For example, if the consciousness deterioration determining unit 102 determines that the consciousness of the driver is deteriorated or lowered (the degree of deterioration of consciousness is high, or the wakefulness is low), or determines that the driver is not looking at the road, the common assist determining unit 105 permits the driving assisting process to be executed. If the driver's intention determining unit 103 determines that the driver performs an intentional operation, the common assist determining unit 105 restricts execution of the driving assisting process.

When the common assist determining unit 105 permits execution of the driving assisting process, the alarm determining unit 106 determines the timing of sounding of the buzzer 12 or the timing of display of a warning message or warning lamp on the display device 13. For example, when the distance between the vehicle and a course boundary (one of the boundaries of the course) as measured in the vehicle width direction becomes equal to or smaller than a predetermined distance, the alarm determining unit 106 causes the buzzer 12 to sound an alert, or causes the display device 13 to display a warning message or warning lamp thereon.

Also, the alarm determining unit 106 may cause the buzzer 12 to sound an alert, or cause the display device 13 to display a warning message or warning lamp, when the time it takes the vehicle to reach a course boundary becomes equal to or shorter than a predetermined time. In the case where the course has a small width, the alarm determining unit 106 may cause the buzzer 12 to sound an alert, or cause the display device 13 to display a warning message or warning lamp, when the distance between the vehicle and a three-dimensional object (such as a curb, guardrail, gutter, or a wall that is present alongside the course) as measured in the vehicle width direction becomes equal to or smaller than a predetermined distance. In the case where the vehicle enters a curve, or is running along a curve, the alarm determining unit 106 may cause the buzzer 12 to sound an alert, or cause the display device 13 to display a warning message or warning lamp, when the distance between the vehicle and a course boundary as measured in the vehicle travelling direction becomes equal to or smaller than a predetermined distance. Also, in the case where the vehicle enters a curve, or is running along a curve, the alarm determining unit 106 may cause the buzzer 12 to sound an alert, or cause the display device 13 to display a warning message or warning lamp, when the time it takes the vehicle to reach a course boundary becomes equal to or shorter than a predetermined time.

In this connection, the above-mentioned predetermined distance or predetermined time is changed in accordance with the output signal (vehicle speed) of the wheel speed sensor 6 and the output signal (yaw rate) of the yaw rate sensor 5. For example, as the vehicle speed is higher, the predetermined distance is set to a longer distance, or the predetermined time is set to a longer time. Also, as the yaw rate is larger, the predetermined distance is set to a longer distance, and the predetermined time is set to a longer time.

The manner of giving a warning to the driver is not limited to sounding of the buzzer 12 and display of a warning message or warning lamp on the display device 13, but another method, such as intermittently changing the torque for fastening the seat belt, may be employed.

When the common assist determining unit 105 permits the driving assisting process to be executed, the control determining unit 107 determines the time at which the electric power steering (EPS) system 14 and/or electronically controlled brake (ECB) system 15 is actuated so as to prevent the vehicle from deviating from the course or colliding with an obstacle. For example, the control determining unit 107 may actuate the electric power steering (EPS) system 14 and/or electronically controlled brake (ECB) system 15 when the distance between the vehicle and a course boundary as measured in the vehicle width direction becomes equal to or shorter than a predetermined distance.

Also, the control determining unit 107 may actuate the electric power steering (EPS) system 14 and/or electronically controlled brake (ECB) system 15, when the time it takes the vehicle to reach the course boundary becomes equal to or shorter than a predetermined time. When the course has a small width, the control determining unit 107 may actuate the electric power steering (EPS) system 14 and/or electronically controlled brake (ECB) system 15 when the distance between the vehicle and a three-dimensional object (such as a curb, guardrail, gutter, or a wall, which exists alongside the course) as measured in the vehicle width direction becomes equal to or smaller than a predetermined distance.

In the case where the vehicle enters a curve or the vehicle is running along a curve, the control determining unit 107 may actuate the electric power steering (EPS) system 14 and/or electronically controlled brake (ECB) system 15 when the distance between the vehicle and a course boundary as measured in the vehicle travelling direction becomes equal to or shorter than a predetermined distance. In the case where the vehicle enters a curve or the vehicle is running along a curve, the control determining unit 107 may actuate the electric power steering (EPS) system 14 and/or electronically controlled brake (ECB) system 15 when the time it takes the vehicle to reach the course boundary becomes equal to or shorter than a predetermined time.

While the predetermined distance or predetermined time used by the control determining unit 107 may be changed according to the vehicle speed and the yaw rate, like the predetermined distance or predetermined time used by the alarm determining unit 106, the predetermined distance or time used by the control determining unit 107 is set to be shorter than the predetermined distance or time used by the alarm determining unit 106.

When a request to actuate the electric power steering (EPS) system 14 and/or electronically controlled brake (ECB) system 15 is generated from the control determining unit 107, the controlled variable computing unit 108 computes a controlled variable(s) of the electric power steering (EPS) system 14 and/or electronically controlled brake (ECB) system 15, and actuates the electric power steering (EPS) system 14 and/or electronically controlled brake (ECB) system 15 according to the calculated controlled variable(s) and the timing determined by the control determining unit 107. For example, the controlled variable computing unit 108 computes a target yaw rate required to prevent the vehicle from deviating from the course, or a target yaw rate required to circumvent or avoid an obstacle, using the information created by the integrated recognition processing unit 104, the output signal (vehicle speed) of the wheel speed sensor 6, and the output signal (yaw rate) of the yaw rate sensor 5, as parameters. More specifically, the controlled variable computing unit 108 computes a target yaw rate Ytrg according to the following equation, where D denotes the relative distance between a course boundary or obstacle and the vehicle, T denotes a length of time it takes the vehicle to reach the course boundary or obstacle, and θ denotes the yaw angle of the vehicle relative to the course boundary or obstacle.

$$Ytrg = (\theta \cdot V \cdot \sin \theta)/D$$

The controlled variable computing unit 108 determines the controlled variable (steering torque) of the electric power steering (EPS) system 14 and the controlled variable (brake oil pressure) of the electronically controlled brake (ECB) system 15, using the target yaw rate Ytrg as a parameter. At this time, the relationship between the target yaw rate Ytrg and the steering torque, and the relationship between the target yaw rate Ytrg and the brake oil pressure may be defined in the form of maps in advance. When the target yaw rate Ytrg is smaller than a predetermined value (the maximum value of the yaw rate with which deviation from the course and contact or collision with the obstacle can be avoided only by a steering action), the brake oil pressure of the electronically controlled brake (ECB) system 15 may be set to zero. If different brake oil pressures are applied to the friction brakes of the right and left wheels of the vehicle when the electronically controlled brake (ECB) system 15 is operated, a yaw rate that interferes with the yaw rate produced by the electric power steering (EPS) system 14 may be produced. Therefore, it is desirable to apply substantially the same brake oil pressure to the friction brakes of the right and left wheels.

The method of reducing the running speed of the vehicle is not limited to actuating the friction brakes by means of the electronically controlled brake (ECB) system 15, but the running speed of the vehicle may also be reduced by converting the kinetic energy of the vehicle into electric energy (regeneration), or changing the speed ratio of the transmission so as to increase an engine brake.

The driving assist system as described above makes it possible to inform the driver of the presence of an obstacle or deviation of the vehicle from the course, and assist the driver in an operation to prevent the vehicle from deviating from the course or an operation to circumvent or avoid the obstacle.

In the meantime, when the vehicle deviates from the course or approaches an obstacle according to an intentional operation of the driver, it is desirable to restrict execution of the driving assisting process. If a change of the steering angle takes place along with an operation to give a turn signal, an accelerating operation, or a braking operation (for example, when the vehicle turns right or left, changes lanes, or passes another vehicle), it may be determined that the driver performs an intentional operation, namely, intentionally operates the steering wheel.

However, when the vehicle runs on a road having a small course width, the driver may intentionally cause the vehicle to approach an obstacle, or cause the vehicle to deviate from the course. In this case, the driver may only perform a steering operation (i.e., operate or turn the steering wheel) without performing any of the operation to give a turn signal, accelerating operation, and braking operation at the same time. Therefore, there is a possibility that the driving assisting process is undesirably carried out even though the driver intentionally operates or turns the steering wheel.

In view of the above situation, the driving assist system according to this embodiment makes it possible to restrict execution of the driving assisting process, even in the case where the steering operation is performed without accompanying any of the operation to give a turn signal, accelerating operation, and braking operation.

The function of the driver's intention determining unit 103 according to this embodiment will be described in detail.

Having done diligent experiments and studies, the inventor found that when the driver performs an intentional steering operation, the steering operation is followed by a steering holding operation, i.e., an operation to keep applying steering torque to the steering wheel. Here, one example of measurement results of steering torque when the driver intentionally turns the steering wheel is shown in FIG. 2.

Figure 2:
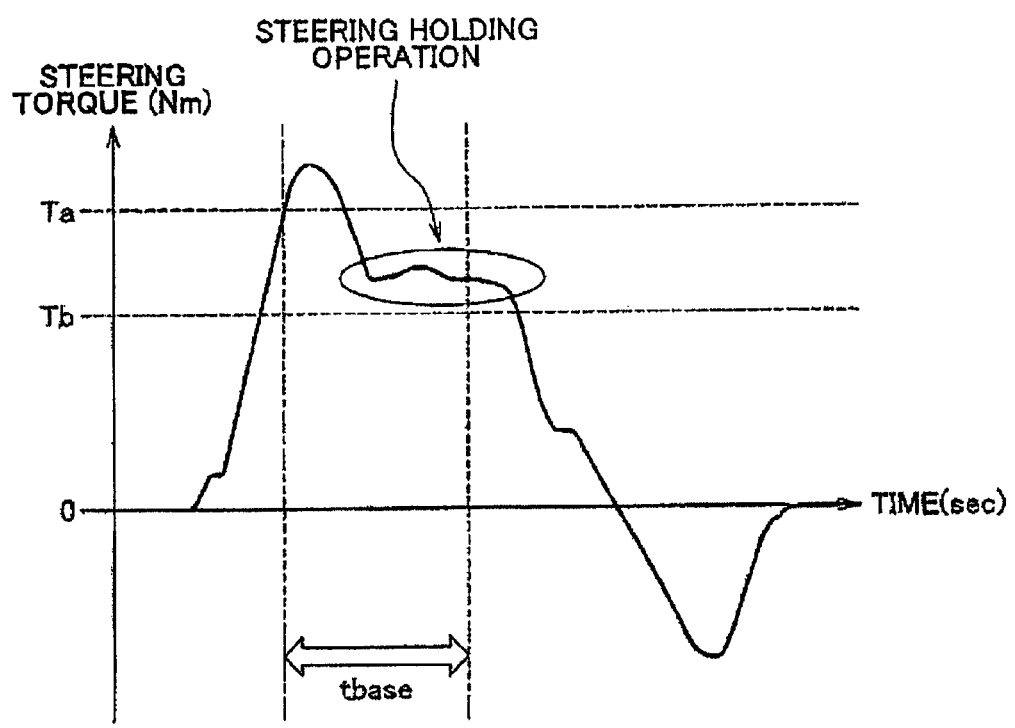
FIG. 2 is a view concerned with the first embodiment of the invention, showing one example of changes in steering torque measured when the driver intentionally performs a steering operation.

As shown in FIG. 2, when the driver starts turning the steering wheel, the steering torque rapidly increases. Once the steering angle reaches a desired angle, the steering torque that has been on the increase starts decreasing. However, in order to prevent the steering wheel from immediately returning to the neutral position, the driver applies torque against self aligning torque (steering reaction force), to the steering wheel, (namely, the driver performs a steering holding operation). As a result, the amount of reduction of the steering torque is reduced for a certain period of time (a range surrounded by a circle in FIG. 2). Namely, when the steering holding operation is performed, the steering torque is kept equal to or larger than a given magnitude for a certain period (steering holding period) after the steering torque reaches a peak. Thus, the magnitude of the steering torque after it reaches a peak is different between the case where the driver intentionally turns the steering wheel and the case where the driver does not intentionally turn the steering wheel.

Therefore, the driver's intention determining unit 103 of this embodiment determines whether the driver intentionally turns the steering wheel, based on changes in the magnitude of the steering torque after it reaches the peak, in other words, the presence or absence of the steering holding period after the steering torque reaches the peak. In determining the presence or absence of the steering holding period, the driver's intention determining unit 103 determines that the steering holding period is present, under conditions that the peak value of the steering torque is equal to or larger than a reference peak value 713, and a period of time for which the steering torque is kept equal to or larger than a threshold value Tb after reaching a peak equal to or larger than the reference peak value Ta is equal to or longer than a reference time tbase. When the steering holding period is present, the driver's intention determining unit 103 determines that the driver intentionally operates the steering wheel.

The above-mentioned reference peak value Ta is set to a value that is larger than the maximum value of torque that can be applied to the steering wheel by a driver who is in a highly wakeful condition so as to keep the vehicle running straight, and is also larger than the maximum value of torque that can be applied to the steering wheel by a driver who is in a condition of low wakefulness and low consciousness. In order to carry out the driving assisting process with higher reliability when the driver does not intentionally operate the steering wheel, it is desirable to set the reference peak value Ta to the largest possible value. However, if the reference peak value Ta is excessively large, the driving assisting process is more likely to be executed even when the driver intentionally operates the steering wheel. Accordingly, it is desirable to statistically obtain the minimum value the peak value of the steering torque can take when the driver intentionally operates the steering wheel, and adaptively determine the reference peak value Ta so that it does not deviate largely from the minimum value.

The above-mentioned threshold value Tb is obtained by adding a margin to the maximum torque that can be applied to the steering device by a driver who is a condition of low wakefulness and low consciousness. Also, the above-mentioned reference time tbase is a length of time obtained by adding a margin to the maximum value of the time for which the maximum torque that can be applied to the steering device by a driver who is in a condition of low wakefulness and low consciousness can be maintained (i.e., the time for which the maximum torque can be kept applied to the steering device). These "threshold value" and "reference time" axe obtained in advance by adaptive procedures using experiments, or the like.

If the driver's intention is determined by the method as described above, execution of the driving assisting process can be restricted when the vehicle approaches an obstacle or deviates from the course according to a driver's intentional steering action.

In the following, a procedure of executing a driver's intention determining process will be described with reference to FIG. 3. FIG. 3 is a flowchart illustrating a driver's intention determining routine. This routine is stored in advance in the ROM of the ECU 1, and is periodically executed by the ECU 1. The driver's intention determining process is executed when the turning angle of the wheels or the steering angle of the steering wheel changes.

In the driver's intention determining routine, the ECU 1 initially reads the output signal (steering torque) Trq of the steering torque sensor 11 in step S101. Thus, execution of step S101 by the ECU 1 provides the detecting means according to the invention.

In step S102, the ECU 1 determines whether the absolute value of the steering torque Trq read in step S101 is equal to or larger than the reference peak value Ta. If a negative decision (NO) is obtained in step S102 (|Trq|<Ta), the ECU 1 proceeds to step S108, and determines that the driver does not intentionally operate or turn the steering wheel (there is no steering intention). If, on the other hand, an affirmative decision (YES) is obtained in step S103 (|Trq|≥Ta), the ECU 1 proceeds to step S103.

In step S103, the ECU 1 starts a timer t. The timer t measures a length of time that has elapsed from a point of time at which the steering torque Trq reaches a value equal to or larger than the reference peak value Ta. Thus, execution of step S103 by the ECU 1 provides the measuring means according to the invention.

In step S104, the ECU 1 reads the output signal (Trq) of the steering torque sensor 11 again. Then, the ECU 1 proceeds to step S105, and determines whether the absolute value of the steering torque Trq read in step S104 is equal to or larger than the threshold value Tb. If a negative decision (NO) is obtained in step S105 (|Trq|<Tb), the ECU 1 proceeds to step S108, and determines that the driver does not intentionally operate the steering wheel.

If an affirmative decision (YES) is obtained in step S105 (|Trq|≥Tb), the ECU 1 proceeds to step S106. In step S106, the ECU 1 determines whether the measurement time t of the timer t is equal to or longer than the reference time tbase. If a negative decision (NO) is obtained in step S106 (t<tbase), the ECU 1 executes step S104 and subsequent steps again. If, on the other hand, an affirmative decision (YES) is obtained in step S106 (t≥tbase), the ECU 1 proceeds to step S107, and determines that the driver intentionally operates the steering wheel. Thus, execution of steps S106 to S108 by the ECU 1 provides the determining means according to the invention.

Figure 3:
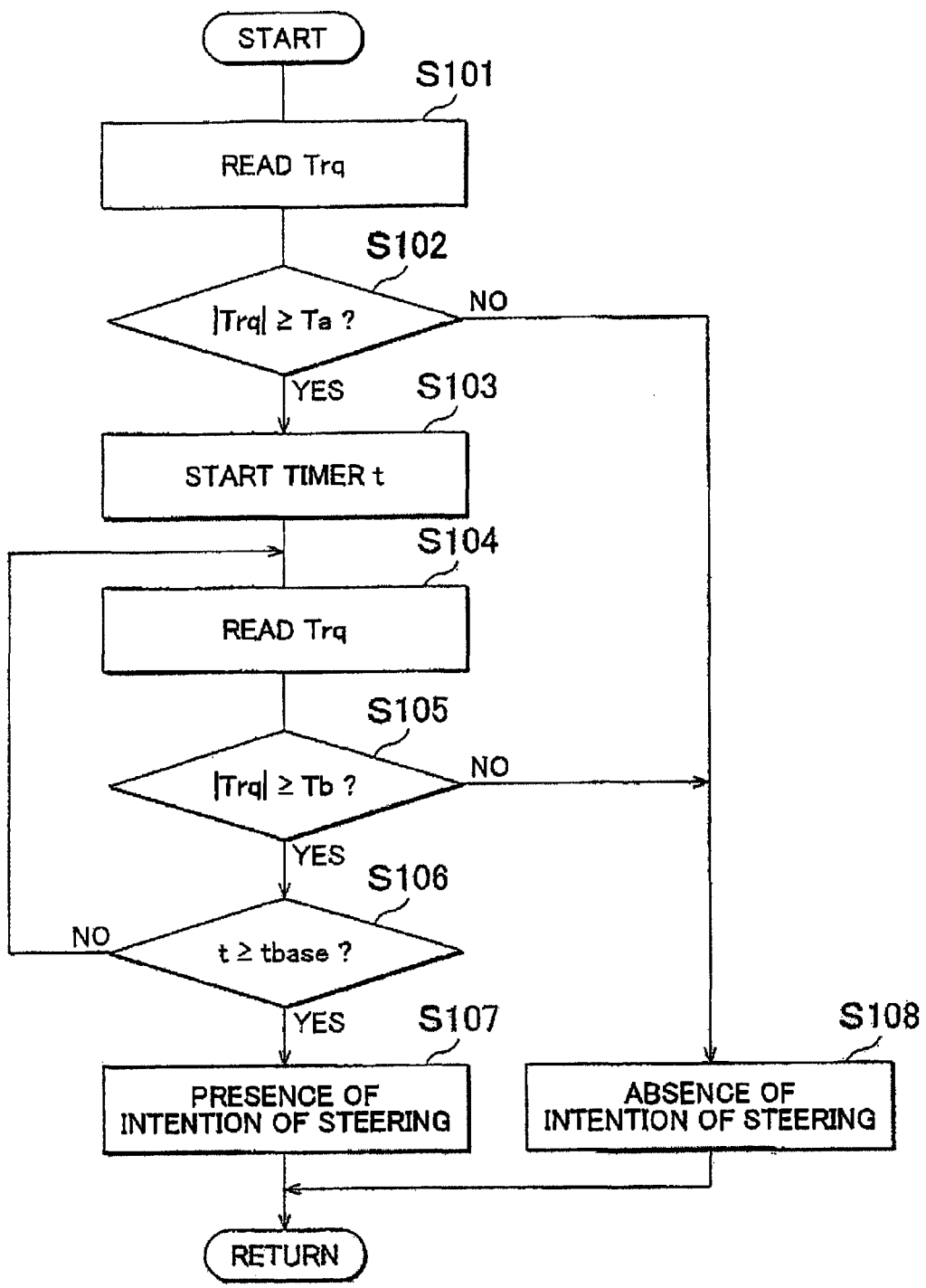
FIG. 3 is a flowchart illustrating a driver's intention determining routine according to the first embodiment of the invention.

By executing the routine of FIG. 3 as described above, the ECU 1 can correctly determine whether the driver intentionally operates the steering wheel. Consequently, it is possible to restrict execution of the driving assisting process when the driver intentionally operates the steering wheel.

While it is determined whether the driver intentionally operates the steering wheel, using the steering torque Trq as a parameter, in this embodiment, a physical quantity correlated with the steering torque Trq may be used as a parameter. For example, the output signal (the steering angle) of the steering angle sensor 10, the output signal (yaw rate) of the yaw rate sensor 5, etc. may be used as physical quantities correlated with the steering torque Trq.

While it is determined whether changes in the steering angle are caused by an intentional steering operation performed by the driver in this embodiment, it may be determined whether changes in the accelerator pedal stroke or position are caused by an intentional accelerating operation performed by the driver. In this case, it may be determined that the driver intentionally performs an accelerating operation, under a condition that a period of time for which the operation torque (pedal pressure) applied to the accelerator pedal is kept equal to or larger than a threshold value after reaching a reference peak value is equal to or longer than a reference time.

Next, a second embodiment of the invention will be described with reference to FIG. 4. In the following, only the arrangements of the second embodiment which are different from those of the above-described first embodiment will be described, and the same or similar arrangements will not be described.

In the first embodiment as described above, it is determined whether the driver intentionally operates the steering wheel, depending on the presence or absence of the steering holding period, and then execution of the driving assisting process is restricted based on the result of the determination. However, in the second embodiment, execution of the driving assisting process is restricted depending on the presence or absence of the steering holding period.

Figure 4:
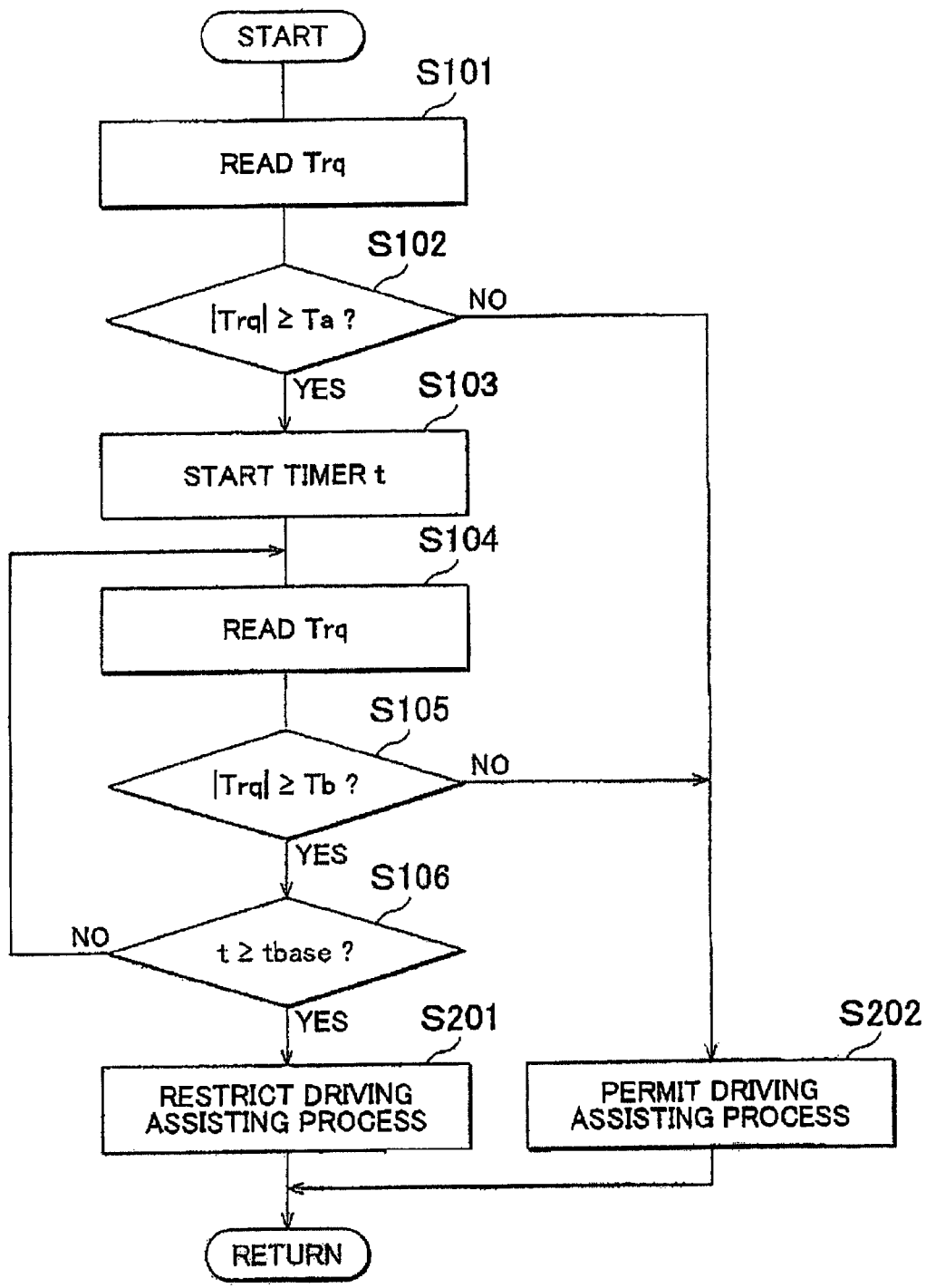
FIG. 4 is a flowchart illustrating a routine executed when determining whether execution of a driving assisting process is to be restricted, according to a second embodiment of the invention.

FIG. 4 is a flowchart illustrating a routine executed by the ECU 1 when it determines whether execution of the driving assisting process is to be restricted. This routine is stored in advance in the ROM of the ECU 1, and is periodically executed by the ECU 1. In the routine of FIG. 4, the same reference numerals (step numbers) as those used in the routine of FIG. 3 are assigned to the same steps.

The routine of FIG. 4 is different from that of FIG. 3 in that step S201 and step S202 are executed in place of steps S107 and S108 of FIG. 3, respectively. Namely, when the ECU 1 determines in step S106 that the measurement time t of the timer t is equal to or longer than the reference time tbase, it proceeds to step S201 to restrict execution of the driving assisting process. If, on the other hand, a negative decision (NO) is obtained in step S102 or step S105, the ECU 1 proceeds to step S202 to permit execution of the driving assisting process.

The "restriction" mentioned herein may be interpreted as inhibiting both execution of a warning operation by the buzzer 12 or display device 13 and execution of a driving assist operation by the electric power steering (EPS) system 14 and/or the electronically controlled brake (ECB) system 15, or may be interpreted as inhibiting execution of a driving assist operation by the electric power steering (EPS) system 14 and/or the electronically controlled brake (ECB) system 15 while permitting execution of a warning operation by the buzzer 12 or display device 13.

The invention claimed is:

1. A vehicle operating condition determining system for a vehicle, the vehicle operating condition determining system comprising:
an electronic control unit, the electronic control unit having control logic configured to cause the electronic control unit to:
detect steering torque or a physical quantity correlated with steering torque when a turning angle of wheels of a vehicle or a steering angle of a steering wheel of the vehicle changes; and
measure a length of time for which a magnitude of the steering torque or a magnitude of the physical quantity detected by the electronic control unit is kept equal to or larger than a first threshold value, after the magnitude of the steering torque or the magnitude of the physical quantity becomes equal to or larger than a second threshold value, the second threshold value being greater than the first threshold value, wherein
when the length of time measured by the electronic control unit is equal to or longer than a reference time, the electronic control unit determines that the turning angle of the wheels or the steering angle of the steering wheel changes due to a driver intentionally turning the steering wheel;
when the length of time measured by the electronic control unit is shorter than the reference time, the electronic control unit determines that the turning angle of the wheels or the steering angle of the steering wheel changes due to the driver unintentionally turning the steering wheel; and
the vehicle is controlled based upon a determination made by the electronic control unit.

2. The vehicle operating condition determining system according to claim 1, wherein when the peak of the magnitude of the steering torque or the peak of the magnitude of the physical quantity detected by the electronic control unit is equal to or larger than the second threshold value, and the length of time measured by the electronic control unit is equal to or longer than the reference time, the electronic control unit determines that the turning angle of the wheels or the steering angle of the steering wheel changes due to the driver's intention.

3. A vehicle driving assist system comprising a vehicle operating condition determining system for a vehicle, the vehicle operating condition determining system comprising:
an electronic control unit, the electronic control unit having control logic configured to cause the electronic control unit to:
detect steering torque or a physical quantity correlated with steering torque when a turning angle of wheels of a vehicle or a steering angle of a steering wheel of the vehicle changes; and
measure a length of time for which a magnitude of the steering torque or a magnitude of the physical quantity detected by the electronic control unit is kept equal to or larger than a first threshold value, after the magnitude of the steering torque or the magnitude of the physical quantity becomes equal to or larger than a second threshold value, the second threshold value being greater than the first threshold value, wherein
when the length of time measured by the electronic control unit is equal to or longer than a reference time, the electronic control unit determines that the turning angle of the wheels or the steering angle of the steering wheel changes due to a driver intentionally turning the steering wheel;
when the length of time measured by the electronic control unit is shorter than the reference time, the electronic control unit determines that the turning angle of the wheels or the steering angle of the steering wheel changes due to the driver unintentionally turning the steering wheel;
the vehicle is controlled based upon a determination made by the electronic control unit; and
when it is determined by the electronic control unit that the turning angle of the wheels or the steering angle of the steering wheel changes due to the driver intentionally turning the steering wheel, execution of a driving assisting process is restricted.

4. A method of determining an operating condition of a vehicle, the vehicle including an electronic control unit having control logic configured to cause the electronic control unit to carry out the method, the method comprising:
detecting a steering torque or a physical quantity when a turning angle of wheels of a vehicle or a steering angle of a steering wheel changes;
measuring a length of time for which a magnitude of the steering torque or a magnitude of the physical quantity detected is kept equal to or larger than a first threshold value after the magnitude of the steering torque or the magnitude of the physical quantity becomes equal to or larger than a second threshold value, the second threshold value being greater than the first threshold value;

determining, when the length of time measured is equal to or longer than a reference time, that the turning angle of the wheels or the steering angle of the steering wheel changes due to the driver intentionally turning the steering wheel;

determining, when the length of time measured is shorter than the reference time, that the turning angle of the wheels or the steering angle of the steering wheel changes due to the driver unintentionally turning the wheel; and controlling the vehicle based upon a determination made by the electronic control unit.

* * * * *